3,294,682
MEANS FOR PREVENTING HIGH TEMPERATURE SEIZING
Michael J. MacKinnon, West Lake, Ohio, assignor to Bell Aerospace Corporation
No Drawing. Filed Apr. 11, 1962, Ser. No. 186,643
1 Claim. (Cl. 252—25)

This invention relates to the problem of seizure or fusion as between threaded members exposed or subjected to elevated temperature and pertains, in particular, to means applied at the interface between such members to prevent such seizure or fusion.

In the field of rocketry or other fields where high temperatures are encountered, it is not uncommon that thread-joined metal parts are subjected to such temperatures as causes seizing. Consequently, subsequent disassembly of such parts may be impossible or, at best, extremely difficult. In many cases, common practice and procedure is simply to cut or sever the so-joined parts which, of course, dictates that they be scrapped and replaced even though they may be otherwise structurally sound and capable of reuse. Whereas known compounds, notably a colloidal suspension of molybdenum disulphide and graphite, operate as anti-seizing agents at elevated temperatures, their use is definitely limited. For example, the above colloidal suspension is of questionable utility at or above temperatures as low as 1500° F. whereas thread-joined parts, in the field of rocketry in particular, may be subjected to temperature in the order of 2000° F. It is therefore a primary object of this invention to provide an anti-seizing compound for use between thread-joined metal parts exposed or subjected to elevated temperatures. By the term "anti-seizing" is meant the prevention of joining together or seizure of parts as caused by fusion or like phenomena occurring at elevated temperatures.

Specifically, the present invention contemplates the use of boron nitride, together with a suitable carrier therefor, as an anti-seizing coating compound to be applied to threaded metal parts prior to their joining, such compound having been found to be particularly efficacious at elevated temperatures as high as 2000° F. Insofar as the carrier is concerned, any suitable substance may be used. However, it is preferred that the carrier itself be capable of withstanding the temperatures involved so as to avoid seizing tendencies ensuing from the carrier itself. For this reason, I prefer to use a silicone as the carrier and, more specifically, to use DC–200 silicone oil available from Dow Chemical Co. of Midland, Michigan.

In a preferred embodiment of the invention, I use boron nitride having a minimum purity of 99.5% mixed to paste consistency with DC–200 silicone oil. This paste is applied directly to the threaded parts whereafter they are joined and torqued to the proper value. Such compound was initially tested on both tantalum-stainless steel and tantalum-tantalum fittings in connection with rocket test cells and, when used, no evidence of seizing or fusing was encountered at temperatures as high as 2000° F., i.e. the fittings separated as easily after high temperature atmosphere exposure as if no such exposure had occurred.

As stated previously, any suitable fluidizing carrier for the boron nitride may be used, the purpose thereof being to assure a more or less uniform coating or film of boron nitride at the interface between the parts as joined.

The boron nitride acts as a protective film or barrier between the metal parts, its high melting point (5000° F.) preventing fusion stemming from the film or barrier. That is, the film apparently prevents contact between the parts which would otherwise fuse together or seize at the temperatures involved. At the same time, the boron nitride, being an abrasive, will tend during disassembly of the parts, to cut away and thus clean up ony isolated metal surface portions which may seize. For this reason, it is desirable that the boron nitride be of rather small grain size, preferably such that the powder will pass through a 325 mesh screen, since the normal fit between threads will accept such size and, at the same time, such grain size will effectively separate the metal parts and form a barrier therebetween.

What is claimed is:

In combination with a pair of threadedly engaged members having predetermined clearance between the threadedly engaged parts thereof,
    a coating of a composition consisting essentially of boron nitride particles and a carrier therefor forming a substantially uniform layer of discrete particles of boron nitride disposed between the threadedly engaged parts of such members,
    said particles being of a size to pass through a 325 mesh screen and not greater than the stated clearance so as to permit engagement of said parts while preventing any substantial degree of area contact therebetween.

References Cited by the Examiner

UNITED STATES PATENTS

| | | | |
|---|---|---|---|
| 2,156,803 | 5/1939 | Cooper et al. | 252—25 |
| 2,205,990 | 6/1940 | Nelson et al. | 252—19 |
| 2,419,252 | 4/1947 | Bychinsky et al. | 252—25 |
| 2,446,251 | 8/1948 | Stricklin | 252—25 |
| 2,748,030 | 5/1956 | Silversher et al. | 117—161 |
| 2,960,466 | 11/1960 | Saunders | 252—25 |
| 2,980,475 | 4/1961 | Wolfe | 252—25 X |
| 3,063,941 | 11/1962 | Wilson | 252—19 X |

FOREIGN PATENTS 492,893    5/1953    Canada.

OTHER REFERENCES

Gunderson et al., Snythetic Lubricants, Reinhold Publishing Corp., New York, 1962, pages 318–19 relied on.

DANIEL E. WYMAN, *Primary Examiner.*

R. E. HUTZ, I. VAUGHN, *Assistant Examiners.*